US008990785B2

(12) United States Patent
Durand et al.

(10) Patent No.: US 8,990,785 B2
(45) Date of Patent: Mar. 24, 2015

(54) SYSTEM AND METHOD FOR EFFICIENTLY DEPLOYING MASSIVELY DIVERSE PROGRAM INSTANCES TO RESIST DIFFERENTIAL ATTACKS

(76) Inventors: Robert Durand, Gatineau (CA); Clifford Liem, Ottawa (CA); Philip Allan Eisen, Ottawa (CA)

(*) Notice: Subject to any disclaimer, the term of this patent is extended or adjusted under 35 U.S.C. 154(b) by 64 days.

(21) Appl. No.: 13/812,404

(22) PCT Filed: Jul. 29, 2010

(86) PCT No.: PCT/CA2010/001168
§ 371 (c)(1),
(2), (4) Date: Jan. 25, 2013

(87) PCT Pub. No.: WO2012/012861
PCT Pub. Date: Feb. 2, 2012

(65) Prior Publication Data
US 2013/0125090 A1 May 16, 2013

(51) Int. Cl.
G06F 9/44 (2006.01)
G06F 9/45 (2006.01)
G06F 21/14 (2013.01)
G06F 9/445 (2006.01)

(52) U.S. Cl.
CPC .. *G06F 8/30* (2013.01); *G06F 8/61* (2013.01); *G06F 21/14* (2013.01)
USPC ........... 717/136; 717/106; 717/124; 717/126; 717/140; 726/27

(58) Field of Classification Search
None
See application file for complete search history.

(56) References Cited

U.S. PATENT DOCUMENTS

| 5,903,761 | A  | * | 5/1999 | Tyma ........................... 717/148 |
| 6,779,114 | B1 |   | 8/2004 | Chow et al. |
| 7,689,969 | B1 | * | 3/2010 | Wendling ...................... 717/105 |
| 7,779,394 | B2 | * | 8/2010 | Homing et al. ............... 717/136 |
| 7,870,439 | B2 | * | 1/2011 | Fujiyama et al. ............ 714/47.1 |
| 8,020,152 | B2 | * | 9/2011 | Wadsworth et al. .......... 717/126 |

(Continued)

FOREIGN PATENT DOCUMENTS

EP 2009572 A1 12/2008
WO 2009010338 A1 1/2009

OTHER PUBLICATIONS

Mont., M., et al., Reducing Risks of Widespread Faults and Attacks for Commercial Software Applications: Towards Diversity of Software Components, Proceedings of the 26th Annual International Computer Software and Applications Conference, 2002, pp. 271-276, [retrieved on Jun. 6, 2014], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Marc S. Kaufman; Reed Smith LLP

(57) ABSTRACT

A system and method for producing a massive number of diverse program instances so as to deter differential attacks, collusion, and similar hostile actions. Code portions are shown to be defined in various manners, instantiated, and aggregated. The system and method establishes a very large number of program instances that may be deployed. Furthermore, testing is accomplished over a minimal set of instances to provide for high test coverage and high confidence over the fully deployed in stance set without incurring a high penalty.

36 Claims, 12 Drawing Sheets

(56) References Cited

U.S. PATENT DOCUMENTS

| | | | |
|---|---|---|---|
| 8,176,337 B2* | 5/2012 | Ciet et al. | 713/190 |
| 2002/0049698 A1* | 4/2002 | Aoyama | 707/1 |
| 2004/0031015 A1* | 2/2004 | Ben-Romdhane et al. | 717/107 |
| 2004/0103404 A1* | 5/2004 | Naumovich et al. | 717/136 |
| 2004/0255185 A1* | 12/2004 | Fujiyama et al. | 714/4 |
| 2004/0268322 A1* | 12/2004 | Chow et al. | 717/136 |
| 2005/0204348 A1* | 9/2005 | Horning et al. | 717/140 |
| 2005/0210275 A1* | 9/2005 | Homing et al. | 713/190 |
| 2006/0136867 A1* | 6/2006 | Schneider et al. | 717/106 |
| 2007/0234296 A1* | 10/2007 | Zorn et al. | 717/124 |
| 2008/0127125 A1* | 5/2008 | Anckaert et al. | 717/136 |
| 2009/0063867 A1 | 3/2009 | Granados et al. | |
| 2009/0249492 A1* | 10/2009 | Boesgaard Sorensen | 726/27 |
| 2010/0095274 A1 | 4/2010 | Sadowsky | |
| 2010/0180346 A1 | 7/2010 | Nicolson | |
| 2011/0321021 A1* | 12/2011 | Chen et al. | 717/157 |

OTHER PUBLICATIONS

Liem, C., et al., A Compiler-Based Infrastructure for Software-Protection, Proceedings of the third ACM SIGPLAN workshop on Programming languages and analysis for security, 2008, pp. 33-44, [retrieved on Nov. 4, 2014], Retrieved from the Internet: <URL:http://dl.acm.org/>.*

Franz, M., E unibus pluram: Massive-Scale Software Diversity as a Defense Mechanism, Proceedings of the 2010 workshop on New security paradigms, 2010, pp. 7-16, [retrieved on Nov. 4, 2014], Retrieved from the Internet: <URL:http://dl.acm.org/>.*

Extended European Search Report cited in corresponding European Application No. 10855133.4 dated Jul. 11, 2014.

Cohen F B Ed—Weippl Edgar R: "Operating System Protection Through Program Evolution", Computers & Security, Elsevier Science Publishes, Amsterdam, NL, vol. 12, No. 6, Oct. 1, 1993.

* cited by examiner

SYSTEM AND METHOD FOR EFFICIENTLY DEPLOYING MASSIVELY DIVERSE PROGRAM INSTANCES TO RESIST DIFFERENTIAL ATTACKS

FIELD OF THE INVENTION

The present invention relates generally to software that is resistant to unauthorized analysis. More particularly, the present invention relates to systems and methods for the production of software code that increase build-time diversity by constructing differing programs to resist an attacker's efforts through differential attacks, collusion, and automated exploits.

BACKGROUND OF THE INVENTION

In the field of computing, software typically exhibits modular characteristics rather than being monolithic. Moreover, there are oftentimes a number of separate and distinct algorithms employed within any given piece of software. Such disparate algorithms combine in such a manner so as to provide services (i.e., functionalities) that are needed by the software. It is often the case that for one particular service, many different algorithms are available. Generally speaking, an algorithm in this scenario is a sequence of computational steps that carries out a task or a set of tasks. An algorithm can have various sizes. It can be very large, or it can be as small as a set of a few instructions. An algorithm can contain smaller algorithms, which in turn can contain even smaller algorithms. This hierarchy may have any number of levels.

It is well understood that such software can be reverse engineered or otherwise tampered with by an attacker in many ways. Such tampering is undesirable in many commercial applications and has given rise to cryptography to counter any such attacks. This is particularly evident in large scale server-client applications. In such applications, frequent updates of client software for the purposes of deploying new features or to patch security vulnerabilities can lead to a whole new class of attacks requiring refined cryptography techniques. This is because updating software with new protection can have the unintended consequence of leading an attacker directly to the protected assets whereby the attacker needs only to compare to previous versions of the software.

Such additional attacks are not limited to differential attacks of software revisions for the identification of assets, but may also include collusion between parties which itself may lead to key sharing schemes, or may also include code-lifting attacks that might identify important modules such as code used to generate device keys or roots-of-trust. Code-lifting can lead to rogue systems where some of the real application is reused together with an attacker's code. In such instances, damage can spread very quickly, as exploits are often posted at various places on the Internet.

In the protection of software, layered defenses are often presented as a high entry barrier to a system. However, applying layered protection against such new class of attacks is often a trade-off between the performance and size of an application. Existing efforts to reduce the window of opportunity to exploit vulnerabilities exposed by this trade-off include relying upon the capability for build-time diversity.

One way to reduce the risk of differential attacks across several clients is to make individual differing instances of the software. In another situation, software can be upgraded (e.g., to support new features, enhance performance, or to patch vulnerabilities) using build-time diversity capability to renew the software as well as to distribute the new protection of the vulnerable module. This allows the full software revision to be diverse with respect to the former revision, preventing obvious differential attacks. In yet another situation, diversity can also play a part in enabling revocation schemes by creating a data diversity capability. This is a useful feature for disallowing clients to connect to a server if, for example, they do not comply with company policies (e.g. don't pay the bills). However, such diversity schemes encounter scaling problems in larger deployments due to the increased need for more and more differing programs which must all be constructed by build tools, which traditionally take a long time to execute.

Existing build-time techniques to produce diverse programs suffer from an inability to produce large-scale deployments of different instances in both an efficient manner and with a high confidence level. The difficulty in confidence level is manifested through the inability of known systems and methods to test a large set of diverse program instances. In particular, the time required for testing all diverse instances can be unfeasibly high if there are a large number of instances. An efficient method for generating diverse instances with regard to the ability to test would improve the cycle of deployment from both a build-time and validation perspective. It is, therefore, desirable to provide a more universally useful system and method to increase build-time diversity.

SUMMARY OF THE INVENTION

It is an object of the present invention to obviate or mitigate at least one disadvantage of previous methods of build-time diversity.

The present invention provides a system and method embodied in software to produce massively diverse program instances to resist attacks. As mentioned, software is characteristically modular. As such, code portions of a program (e.g., function definitions, basic-blocks, variable definitions, bodies of functions, sets of instructions) can be written multiple times and in multiple variations. In regard to the present invention, each instance of a code portion variation is enclosed in a conditional compilation command. From this arrangement, combinations of code portions can be quickly constructed by changing conditional compilation definitions and re-invoking the target compiler. Furthermore, a minimal set of full programs can be constructed guaranteeing that all code portions are used. This provides reasonable test coverage of all code portions. Moreover, this is accomplished without requiring the testing of all combinations of code portions which is unfeasible in terms of required testing time. In effect, the present invention increases the confidence that all code in the software has been covered, while minimizing the time to test all instances.

In a first aspect, the present invention provides a method of providing build-time diversity in computer software source code, the method including: partitioning the code into code portions; identifying code portion interfaces of the code portions; generating diverse instances of the code portions and the code portion interfaces; creating test instances, the test instances being representative all the diverse instances of the code portions and the code portion interfaces; and forming deployment instances using varied combinations of the diverse instances of the code portions and the code portion interfaces, where operability of all the deployment instances is assured by confirming operability of the test instances.

In another aspect, the present invention provides a system for providing build-time diversity in a computer software source code, the system including: a set of machine executable code segments operable to produce software code that assures build-time diversity in the computer software source code, the machine executable code executable to perform the steps of: partitioning the code into code portions; identifying code portion interfaces of the code portions; generating diverse instances of the code portions and the code portion interfaces; creating test instances, the test instances being representative all the diverse instances of the code portions and the code portion interfaces; and forming deployment instances using varied combinations of the diverse instances of the code portions and the code portion interfaces, where operability of all the deployment instances is assured by confirming operability of the test instances.

In yet a further aspect, the present invention provides an apparatus for providing build-time diversity in computer software source code, the apparatus including: means for partitioning the code into code portions; means for identifying code portion interfaces of the code portions; means for generating diverse instances of the code portions and the code portion interfaces; means for creating test instances, the test instances being representative all the diverse instances of the code portions and the code portion interfaces; and means for forming deployment instances using varied combinations of the diverse instances of the code portions and the code portion interfaces, where operability of all the deployment instances is assured by confirming operability of the test instances.

In yet another aspect, the present invention provides a computer readable memory medium storing computer software code for providing build-time diversity in computer software source code, the computer software code executable to perform the steps of: partitioning the source code into code portions; identifying code portion interfaces of the code portions; generating diverse instances of the code portions and the code portion interfaces; creating test instances, the test instances being representative all the diverse instances of the code portions and the code portion interfaces; and forming deployment instances using varied combinations of the diverse instances of the code portions and the code portion interfaces, where operability of all the deployment instances is assured by confirming operability of the test instances.

In all aspects of the present invention, it should be understood that the build-time diversity provided for the computer software source code is substantially improved and increased build-time diversity than prior art mechanisms.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

As mentioned above, an algorithm is generally a sequence of computational steps that carries out a task or a set of tasks. In the present invention, the definition of algorithm should be understood to also encompass the implementations of algorithms. Therefore, an algorithm can be a set of computer instructions or a piece of high level software programming that carries out a task or a set of tasks on a computing device.

Generally, the present invention provides a method and system for processing existing algorithms at the source code level in order to produce an implementation of algorithms that is resistant to differential attacks, collusion, and automated exploits.

Figure 1:
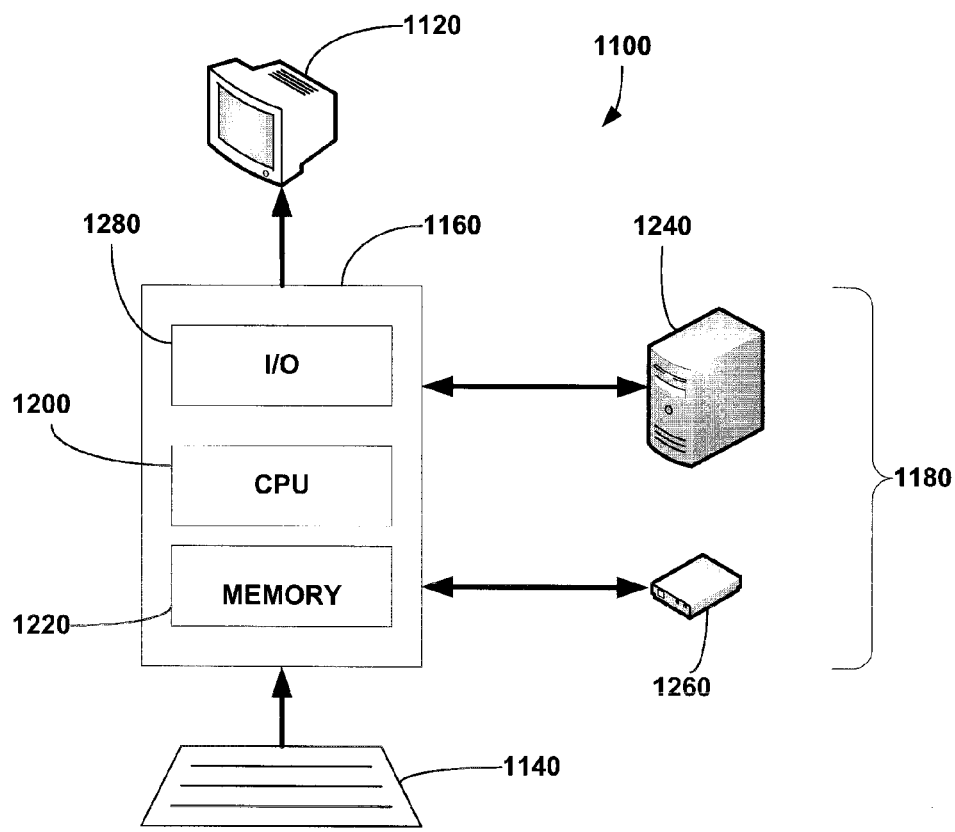
FIG. 1 illustrates a known computer system in which the present invention may be embodied.

It should be understood that the present invention may be practiced upon any given computer system. A simplified example of a computer system upon which the invention may be performed is presented as a block diagram in FIG. 1. This computer system 1100 includes a display 1120, keyboard 1140, computer 1160 and external devices 1180.

The computer 1160 may contain one or more processors or microprocessors, such as a central processing unit (CPU) 1200. The CPU 1200 performs arithmetic calculations and control functions to execute software stored in an internal memory 1220, preferably random access memory (RAM) and/or read only memory (ROM), and possibly additional memory 1240. The additional memory 1240 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 1240 may be physically internal to the computer 1160, or external as in FIG. 1.

The computer system 1100 may also include other similar means for allowing computer programs or other instructions to be loaded. Such means can include, for example, a communications interface 1260 which allows software and data to be transferred between the computer system 1100 and external systems. Examples of communications interface 1260 can include a modem, a network interface such as an Ethernet card, a serial or parallel communications port. Software and data transferred via communications interface 1260 are in the form of signals which can be electronic, electromagnetic, and optical or other signals capable of being received by communications interface 1260. Multiple interfaces, of course, can be provided on a single computer system 1100.

Input and output to and from the computer 1160 is administered by the input/output (I/O) interface 1280. This I/O interface 1280 administers control of the display 1120, keyboard 1140, external devices 1180 and other such components of the computer system 1100.

The invention is described in these terms for convenience purposes only. It would be clear to one skilled in the art that the invention may be applied to other computer or control systems 1100. Such systems would include all manner of appliances having computer or processor control including telephones, cellular telephones, televisions, television set top units, point of sale computers, automatic banking machines, lap top computers, servers, personal digital assistants and automobiles.

Throughout the detailed description of the invention, the terms code portion, code portion instance, and code portion interface will be used.

Code portions are the parts of a program that implement a cohesive piece of functionality. It should be readily apparent that such program parts include generally anything that can be written in a programming language. For example, this may include compilation units, function definitions, declaration statements, definition statements, operations, initializations, basic function block or body, class definitions, object declarations, template definitions, template specializations, partial specializations, array definitions and declarations, structure and aggregate definitions and declarations, system calls, library calls, assembly code, preprocessor directives, or the like.

Code portion instances are one or more constructions of a code portion which executes a defined behavior. Two code portion instances may execute the same behavior according to their external interface. However, the internal make-up of code portion instances may have large variations.

Code portion interfaces are the inter-dependencies of a code portion which allows one code portion to be compatible with one or more other code portions.

In the preferred embodiment, the invention is implemented in terms of an intermediate compiler program running on a computer system 1100. Standard compiler techniques are well known in the art, and will not be reviewed in detail herein. Two standard references which may provide necessary background are "Compilers Principles, Techniques, and Tools" 1988 by Alfred Aho, Ravi Sethi and Jeffrey Ullman (ISBN 0-201-1008-6), and "Advanced Compiler Design & Implementation" 1997 by Steven Muchnick (ISBN 1-55860-320-4).

Generally, a software compiler is divided into three components, described as the front end, the middle, and the back end. The front end is responsible for language dependent analysis, while the back end handles the machine-dependent parts of code generation. Optionally, a middle component may be included to perform optimizations that are independent of language and machine. Typically, each compiler family will have only one middle, with a front end for each high-level language and a back end for each machine-level language. All of the components in a compiler family can generally communicate in a common intermediate language so they are easily interchangeable. This intermediate language is generally in a form which exposes both control- and data-flow so that they are easily manipulated. Such an intermediate form may be referred to as flow-exposed form. In the preferred embodiment of the invention, it is the intermediate code that will be manipulated to make the desired areas of the input software tamper-resistant.

The invention can most easily be applied to software code used by software compilers as a code representation for performing analyses and optimizations involving scalar variables. Similarly, the method of the invention could be applied to software in its high level or low level forms, if such forms were augmented with the requisite control-flow and data-flow information. This flexibility will become clear from the description of the encoding techniques described hereinafter.

As previously mentioned, the present invention is concerned with the creation of diversely built program instances. Diversity is a protection mechanism that enables creation of differently constructed programs, and the present invention uses diversity to prevent an attacker from writing an exploit that will work on the population of all program instances. This produces a high resistance to differential attacks, collusion, and automated exploits.

Figure 2:
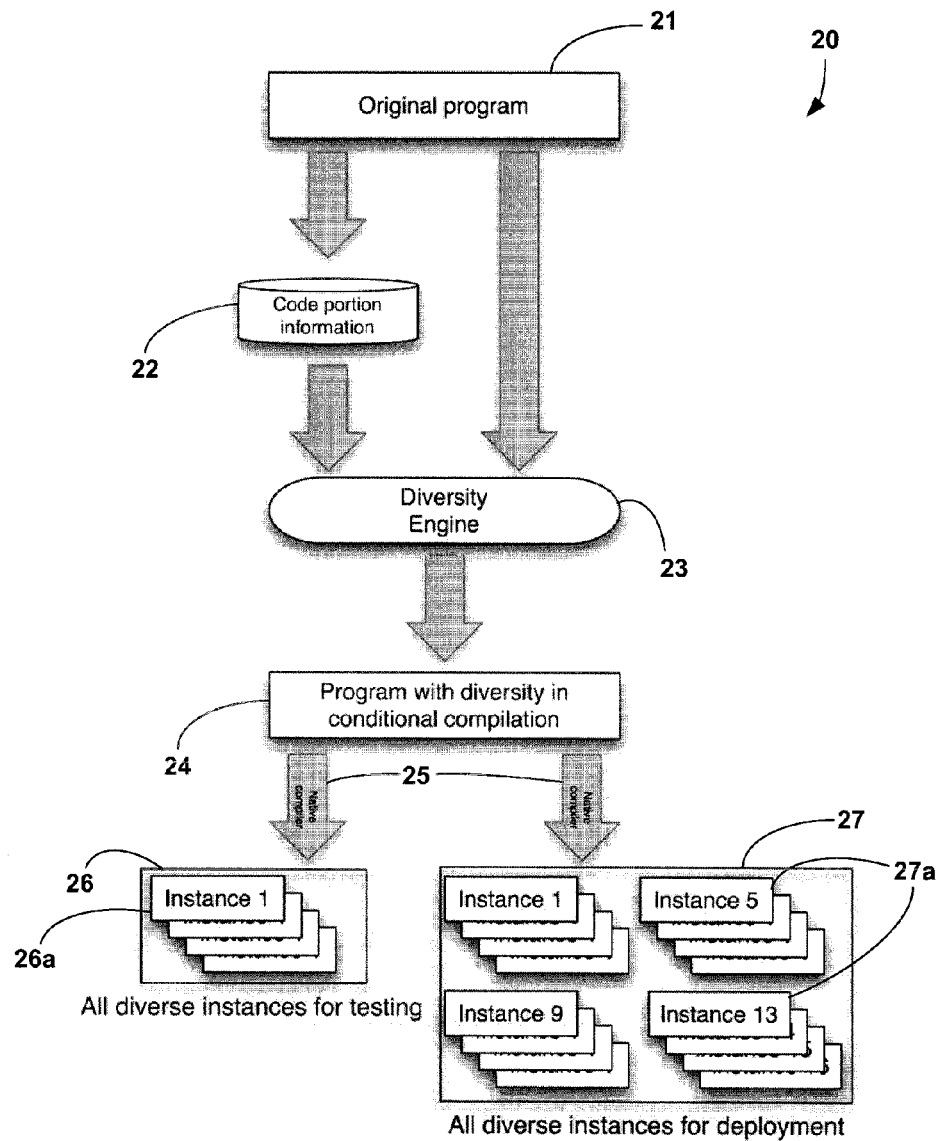
FIG. 2 illustrates an overall process in accordance with the present invention.

With regard to FIG. 2, a simplified block diagram shows the overall system 20 to provide improved build-time diversity in accordance with the present invention. Using a plurality of code portions, code portion interfaces, and a unique method of combining code portions, the present invention quickly and easily produces a very large number of full program instances. Furthermore, the present invention also provides a mechanism that allows the creation of a very large number of full program instances for distribution, while, in contrast, a minimal number of full program "covering" instances is needed for purposes of testing. The manner in which this minimal number of instances for testing is constructed provides high coverage of the code portions created, and therefore, high confidence of the diversification results.

In the overall system 20 shown in FIG. 2, the original program application 21 in source form is the input to a diversity engine 23. Code portions of the program are identified at 22. Based on the code portion information, diverse constructions of the program are created and encapsulated in conditional compilation directives at 24. The native compiler 25 is then invoked many times with appropriate sets of directives (as described further herein below) to produce the final diverse instances 26, 27. A large number of diverse instances 27a are available for deployment, while a smaller number of diverse instances 26a are need for testing. Each of these steps is described in more detail below.

Figure 3:
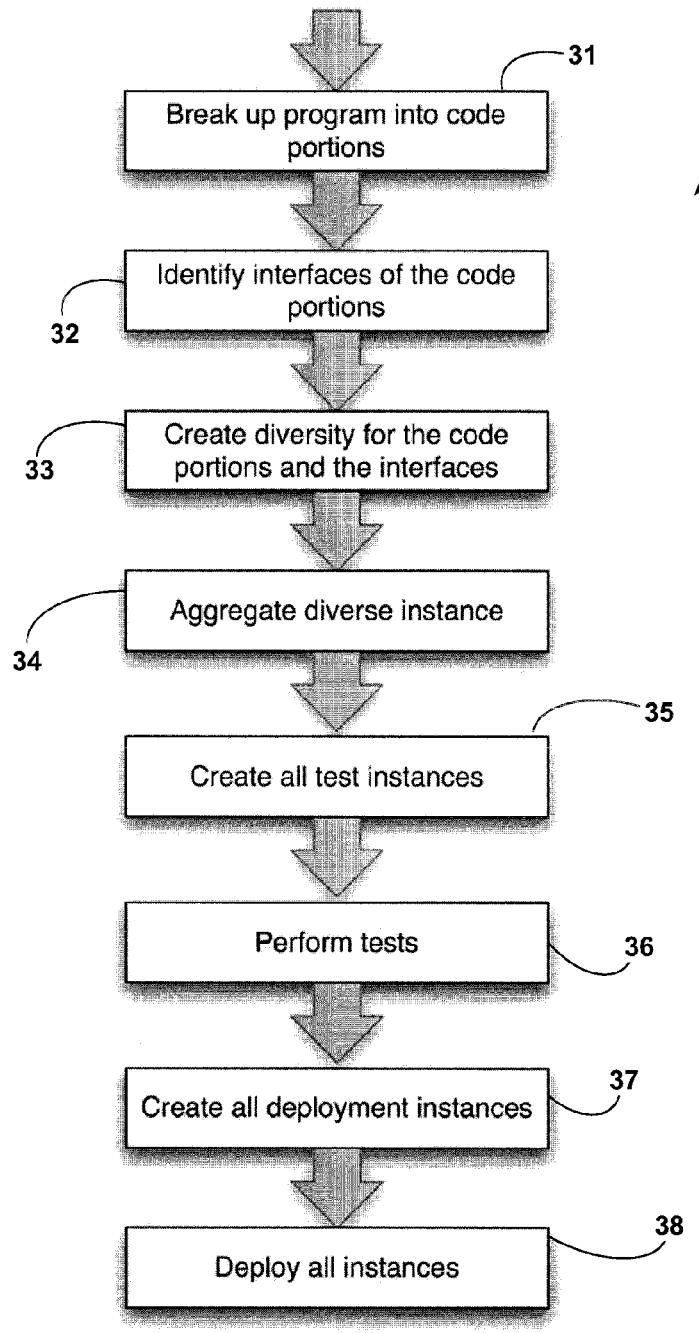
FIG. 3 is a flowchart showing steps for build-time diversity in accordance with the present invention illustrated in FIG. 2.

With regard to FIG. 3, a flowchart is shown illustrating the process 30 for creating build-time diversity in accordance with the present invention illustrated in FIG. 2. The process 30 will now be described in general terms. The first step 31 of the process 30 is to break up the program into code portions. This step 31 may follow several different methods, which are later described herein below in detail. After the code portions are identified at step 31, the interfaces to each code portion are identified at step 32. This interface identification step 32 is significant due to the fact that interfaces may be kept constant, while the code portions may be diversified. Upon identification of the code portions and their interfaces, a diversity creation step 33 occurs. Here, diverse instances for code portions are generated. Additionally, the diverse instances of the code portion interfaces are also generated at this time. The diverse instances of the code portions and interfaces are then aggregated at step 34. It should be understood that the aggregation of compatible code portion instances allows full programs to be created.

With continued reference to FIG. 3, a test instance creation step occurs at 35. This creates all test instances that serve to cover all the code portions under test. Each of these test instances are then tested at step 36 to ensure viability. Once the test instances are satisfactorily tested, step 37 then provides for the creation of all deployment instances. Because the test instances are only representative and serve to cover all the code portions, it should be therefore readily apparent that the number of deployment instances is typically much larger than the number of test instances. Lastly, the final step 38 is of course to deploy all instances of diverse code generated at step 37. It should be understood that the large number of instances provides a greatly improved defense to the threats of differential attacks, collusion, as well as automated exploits.

The breaking up, or partitioning, of the program into code portions as illustrated by step 31 of FIG. 3 will now be described in more detail. In this regard, a program may be partitioned in a variety of manners for the purposes of creating code portions. Each of FIGS. 4 through 8 is an example of a specific method of partitioning of a program into code portions that are used in accordance with the present invention. In general, three approaches to partitioning which result in different types of code portions are described herein below involving: 1) physical partitioning of a program, 2) program flow partitioning of a program, and 3) data flow partitioning of a program.

In general, high-level programming languages like C, C++, and Java allow programs to be written by defining small pieces, combining those into larger pieces, and then combining these larger pieces together to create a full program. Furthermore, the process may be repeated as needed. Examples of the physical pieces of a program include, but are not limited to, the following:

a) variable declarations & definitions, variable initializations;

b) operations, conditions, basic blocks;

c) function declarations & definitions (i.e., bodies);

d) classes, constructor initializations, template, compound statements; and e) compilation units, libraries, full programs.

Figure 4:
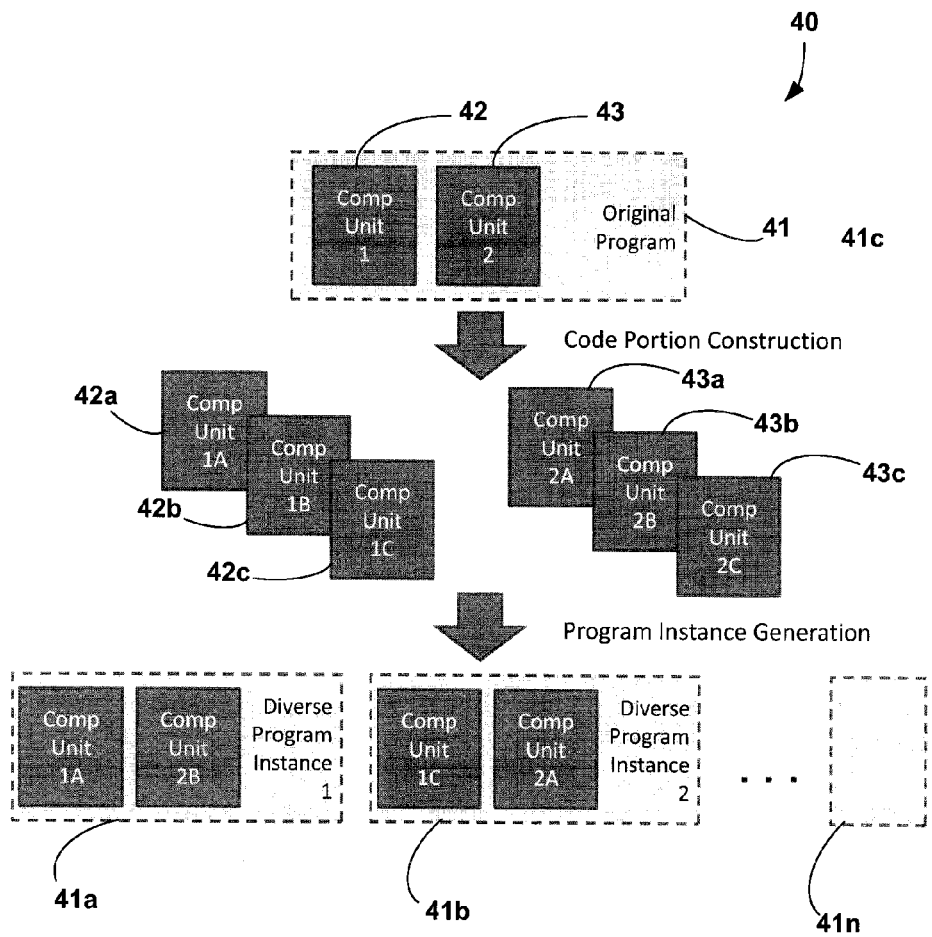
FIG. 4 illustrates physical partitioning into code portions based on the compilation unit in accordance with one embodiment of the present invention illustrated in FIG. 2.

Defining the granularity of code portions as physical pieces of the program provides an efficient basis for program instance generation. For example, if a compilation unit is chosen as the base code portion, then the code portion interface is easily defined as all global data and function dependencies outside of the compilation unit. Moreover, multiple instances can easily be generated by varying the internal construction of the compilation unit. In this manner, FIG. 4 illustrates physical partitioning into code portions based on the compilation unit in accordance with one embodiment of the present invention illustrated in FIG. 2. Here, the original program 41 can be seen to include two compilation units 42, 43. It should be understood that, for clarity of illustration, only two compilation units are shown, though it should be readily apparent that many several compilation units may comprise any given program. Each compilation unit 42, 43 can be used to generate diverse instances of the given compilation unit where compilation units 42*a*, 42*b*, and 42*c* are diverse instances of compilation unit 42 and compilation units 43*a*, 43*b*, and 43*c* are diverse instances of compilation unit 43. In this manner, diverse instances 41*a*, 41*b*, through 41*n* (where n is a function of the number of possible compilation unit combinations) can be formed from the original program 41.

Figure 5:
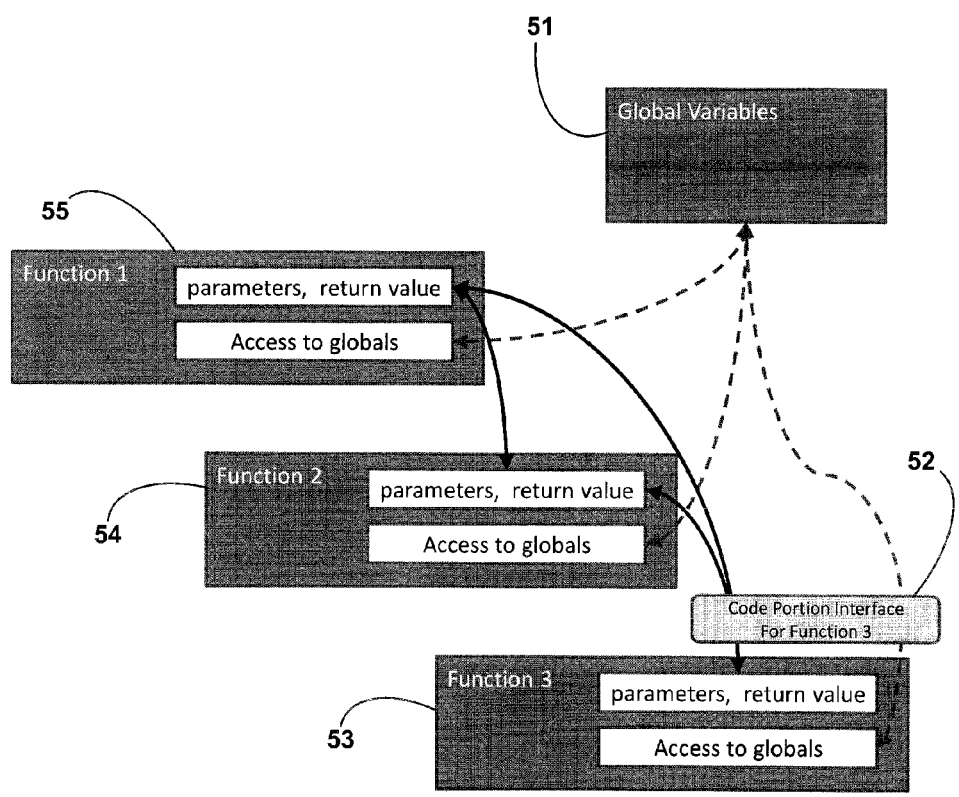
FIG. 5 illustrates physical partitioning into code portions based on function definitions in accordance with another embodiment of the present invention.

Physical partitioning of a program can also be obtained based upon function definitions. FIG. 5 illustrates such physical partitioning into code portions based on function definitions in accordance with the present invention whereby function definitions 53, 54, 55 may form the granularity of code portions. In such situation, the code portion interface 52 becomes the external dependencies of the function, which include the function signature itself, but also any global variables 51 and sub-functions (e.g., parameters, return value, . . . etc.) on which the function depends. Access between the global variables 51 and the function definitions 53, 54, 55 occurs in a first pathway shown by way of dotted lines. Access among and between the function definitions 53, 54, 55 occurs in a second pathway shown by way of solid lines. The code portion interface 52 resides in both the first and second pathways and allows, for example, code portion 53 to be compatible with code portions 54 and 55. For clarity, only one code portion interface 52 is shown for function 53. However, it should be understood that an interface corresponding to functions 54 and 55 would similarly be provided.

As mentioned, in addition to physical partitioning, partitioning that results in different types of code portions can alternatively involve either program flow or data flow partitioning of a program. Two types of program flow partitioning are shown and described further below with regard to FIGS. 6 and 7, and data flow partitioning of a program is shown and described in regard to FIG. 8.

Figure 6:
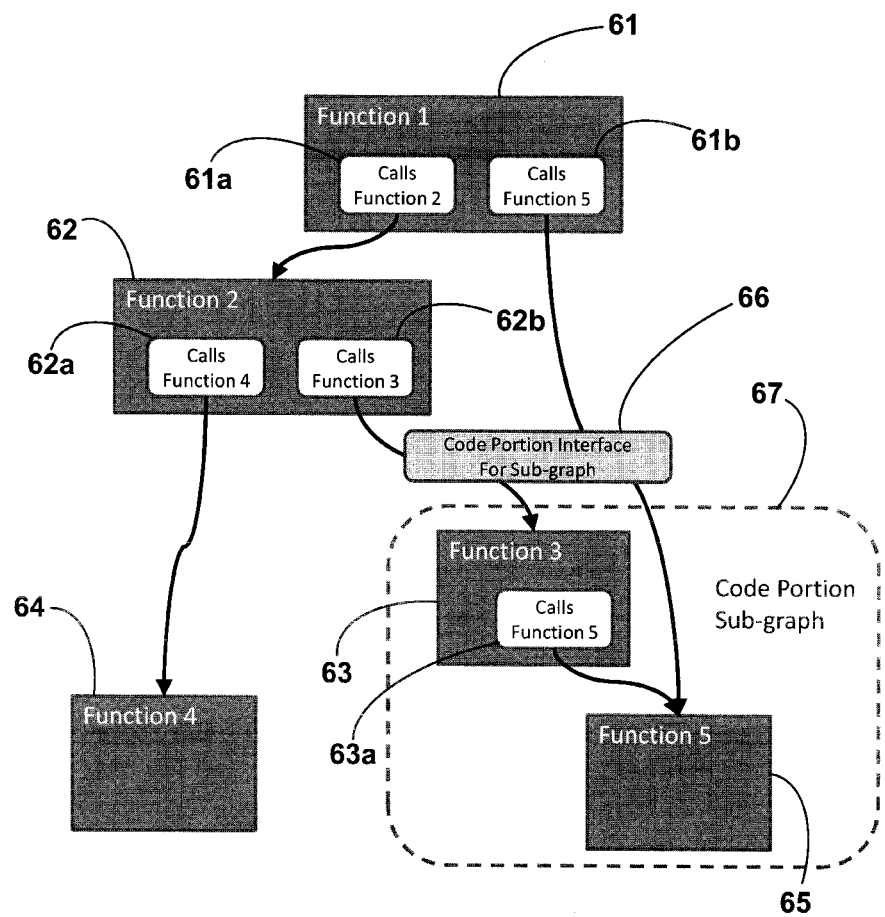
FIG. 6 illustrates program-flow partitioning based on function call sub-graphs in accordance with another embodiment of the present invention.

FIG. 6 illustrates program-flow partitioning based on function call sub-graphs in accordance with the present invention. High-level programming languages typically have the concept of a program flow. At a high granularity, the program flow is procedural and includes function calls and transfers to function definitions. At a low granularity, the program flow includes the execution of individual instructions in a block and conditional or unconditional branches from block to block.

Based on the program flow, code portion construction can be created. For example, FIG. 6 illustrates a program flow having several different functions being called. Here, function 1 at 61 includes two calls 61*a* and 61*b* that, respectively, call function 2 at 62 and function 5 at 65. Likewise, function 2 at 62 includes two calls 62*a* and 62*b* that, respectively, call function 4 at 64 and function 3 at 63. Similarly, function 3 at 63 includes a call 63*a* that calls function 5 at 65. A call-graph represents the flow of functions that are called through a program such as the flow from 61*a* to 62*b* to 63*a* to 65. A sub-graph of the call-graph can be considered a code portion. Here, such a sub-graph 67 is delineated by a dotted line box including the flow 63*a* to 65. It should therefore be readily apparent that a plurality of sub-graphs can become a set of code portion instances.

Figure 7:
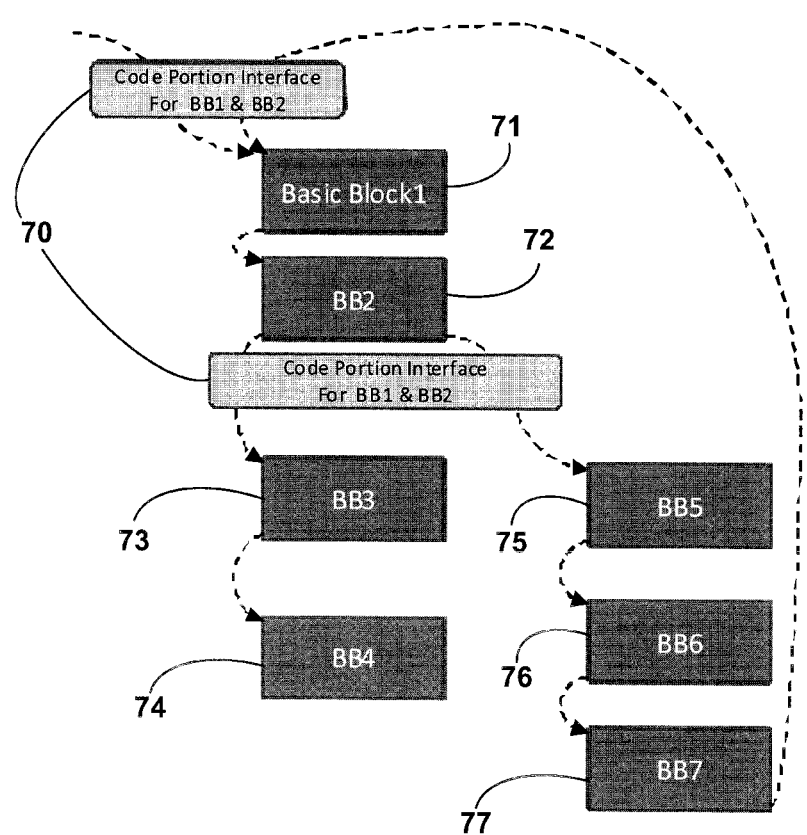
FIG. 7 illustrates program-flow partitioning of a program based on basic blocks in accordance with another embodiment the present invention.

FIG. 7 illustrates program-flow partitioning of a program based on basic blocks in accordance with the present invention. As mentioned, this is another manner of partitioning a program into code portions. Here, basic blocks 71 through 77 and their related conditions may form the granularity for code portions. It should readily understood that conditions are the links between basic blocks. Normally, a basic block is a list of instructions that will be executed one after the other. Each time some "condition" (e.g., an "if") occurs, there can be a jump to another basic block. Which basic block to which the jump is made of course depends on the condition. One way to see this may be with a "branch," whereby each "branch" implies a choice of which basic block to go to depending on the given "condition."

Any given basic block may be constructed as a variety of instances. The program construction can easily be designed to use a variation of block instances as it is put together. In FIG. 7, the code portion example as shown uses two basic blocks 71 and 72 (BB1 and BB2) which together form a defined code portion. The flow of control out of BB2 is an example of a conditional branch or jump as mentioned above. Here, a condition is evaluated in BB2 which determines which direction to take (i.e., to BB3 or BB5). The program flow into the code portion (i.e., the incoming jumps made into BB1) combined with the program flow out of the code portion (i.e., the outgoing jumps made out of BB2) make up this particular code portion interface 70 based on program flow.

Figure 8:
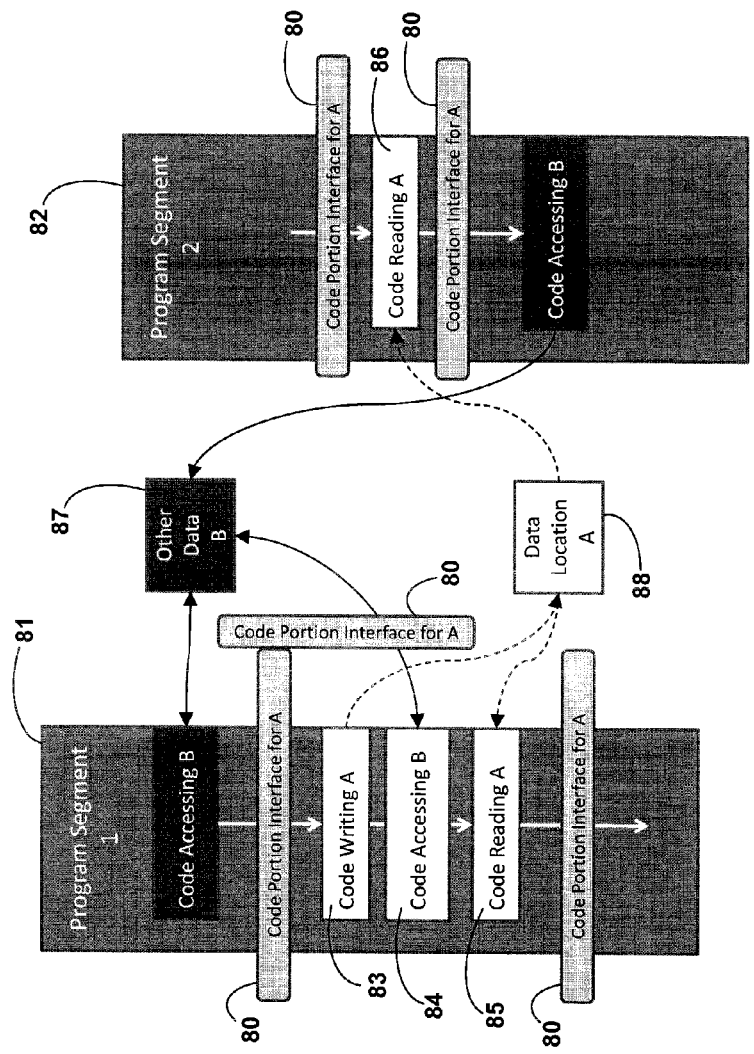
FIG. 8 illustrates an example of partitioning code into one code portion by data-flow in accordance with another embodiment the present invention.

Yet another manner of partitioning a program into code portions is shown and described in regard to FIG. 8. Here, there is illustrated an example of partitioning code into one code portion by data-flow in accordance with the present invention. The concept of data variables and their usage is universal in programming languages. This includes local variables, global variables, static variables, class/structure fields, and constants which can simply be considered as read-only variables. Data may take on scalar forms or aggregate forms such as arrays or structures. Data typically flows from memory through loads to registers, then undergoes operations by way of instructions, and flows through stores back to memory. Accordingly, data flow in a program has somewhat different properties than the program flow. Data flow may also be considered as the basis to construct code portions. Known data encodings such as shown in U.S. Pat. No. 6,594,761 issued to Chow et al., and herein incorporated by reference, is an example of alternate forms for storing data that includes transforming the instructions that operate on that data. For purposes of the present invention, it should be readily apparent that these data encodings can be considered as different code portion instances.

In regards to data encodings, the code portion interface is more complex than either physical or program flow partitioning. Isolating the stored data form requires knowledge of the program flow as well as all accesses to data locations. This information may be derived through the known compiler analysis phases, such as alias analysis, control-flow, and data-flow analysis. The code portion consists of all the code needed to form data accesses. That is to say, the code portion consists of all the code needed to access the data location, including all code that accesses the data location through aliasing. The code portion interface is then formed by all the connections to the rest of the program. This includes the program flow and accesses to all external data.

With reference to FIG. 8, a data-flow partitioning example is illustrated showing partitioning of the software code into one code portion by data-flow. Here, blocks 83, 84, 85, and 86 represent all the code necessary to access data location A at block 88. This includes code that may access block 88 through aliasing. The code portion interfaces 80 contain all the program and data-flow to all these pieces of code in white. This includes the program and data-flow coming in and going out of blocks 83, 84, and 85 in program segment 1 at 81, the code needed in block 84 to access external data (i.e., other data B at 87), and the program and data-flow coming in and going out of block 86 in program segment 2 at 82. For purposes of illustrative clarity, data flow with regard to data location A at 88 is indicated by way of dotted lines, while data flow with regard to the other data B at 87 is indicated by way of solid lines. As such, it can be seen that all dotted line data flow related to accessing data location A at 88 is contained within the code portion interfaces 80 thereby effectively partitioning the software code by way of data-flow partitioning.

Once partitioning of the original software code is accomplished by way of physical partitioning, program flow partitioning, or data flow partitioning in the manner described above and illustrated by FIGS. 4 through 8, diverse instances of the code portions and code portion interfaces as seen in step 33 of FIG. 3 may then be generated. It should of course be recognized that other partitioning methods may be possible without straying from the intended scope of the present invention. Generating diverse code portion instances is illustrated and described with regard to FIG. 9 and FIG. 10.

Figure 9:
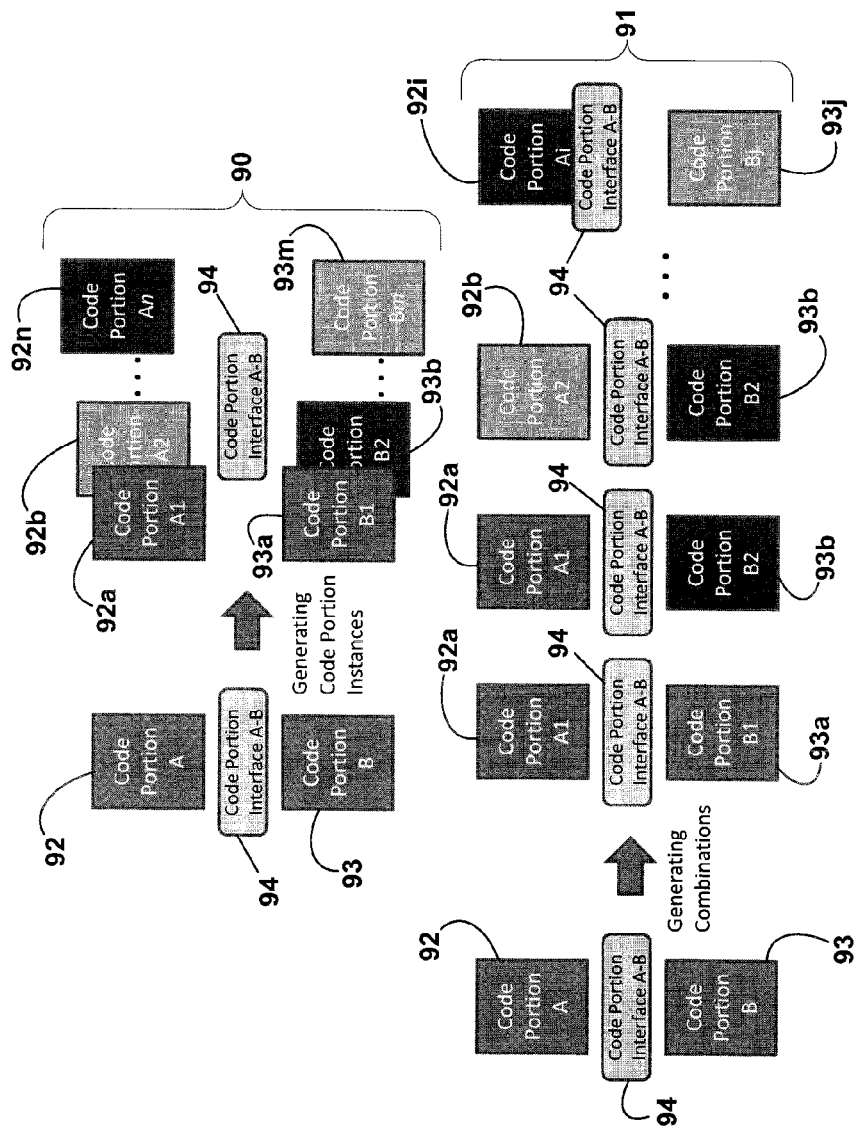
FIG. 9 illustrates one exemplary method for generating diverse code portion combinations with a fixed interface in accordance with the present invention.

In FIG. 9 there is shown one exemplary method for generating diverse code portion combinations with a fixed interface in accordance with the present invention. Creation of such variations in code portions can be accomplished according to known methods, or combinations of such methods, including those described in U.S. Pat. Nos. 6,594,761, 6,779,114, or 6,842,862 each issued to Chow et al. and incorporated herein by reference in their entireties. The variations in code portions are characterized both by their code portion interfaces and their inner construction. In each of the partitioning cases already described (i.e., physical, program-flow, data-flow), the code portion interfaces may have a different make-up. However, the general concept is the same such that the code portion interface may remain fixed while the internals of the code portion are made diverse. Additionally, the code portion interface may also be made diverse. With a plurality of code portions, code portion interfaces, and code portion types, the ability to create diverse program instances can grow very quickly.

With reference to FIG. 9, a fixed code portion interface A-B, 94, is shown in sub-procedures 90, 91 which, respectively, include generating code instance portions and generating combinations of such code instance portions.

As can be seen in sub-procedure 90, code portions 92 and 93 shown as code portion A and code portion B, respectively, may be written multiple times as code portions A1, A2, . . . An and B1, B2, . . . Bm where n and m are integers representative of the possible code portion variations for portions A and B, 92, 93. These multiple code portions 92a, 92b, . . . 92n and 93a, 93b, . . . 93m each include the identical code portion interface A-B, 94. Thus, within procedure 90, when generating variations in code portions 92, 93 while keeping the interfaces 94 fixed, each code portion 92 and 93 is written multiple times 92a through 92n and 93a through 93m, respectively, and in at least two forms. It should be understood that the variations embodied in code portions 92a, 92b, . . . 92n and 93a, 93b, . . . 93m may be generated once and stored, for example, in a library for later use in sub-procedure 91.

In sub-procedure 91, combinations are generated using the previously generated code portion instances 92a, 92b, . . . 92n and 93a, 93b, . . . 93m. Here, combinations shown include code portion instance combination A1/B1 (92a, 93a) code portion instance combination A1/B2 (92a, 93b), and code portion instance combination A2/B2 (92b, 93b), where each combination includes the fixed code portion A-B interface 94. The total combinations may be made up to combination Ai/Bj (92i, 93j) where i and j represents the number of combinational variations for a particular set of code portions. To perform a complete, full program instance, conditional compilation variables are defined such that the final compilation is resolved. It should therefore be readily apparent that this process can advantageously create a large number of potential diverse instances.

Figure 10:
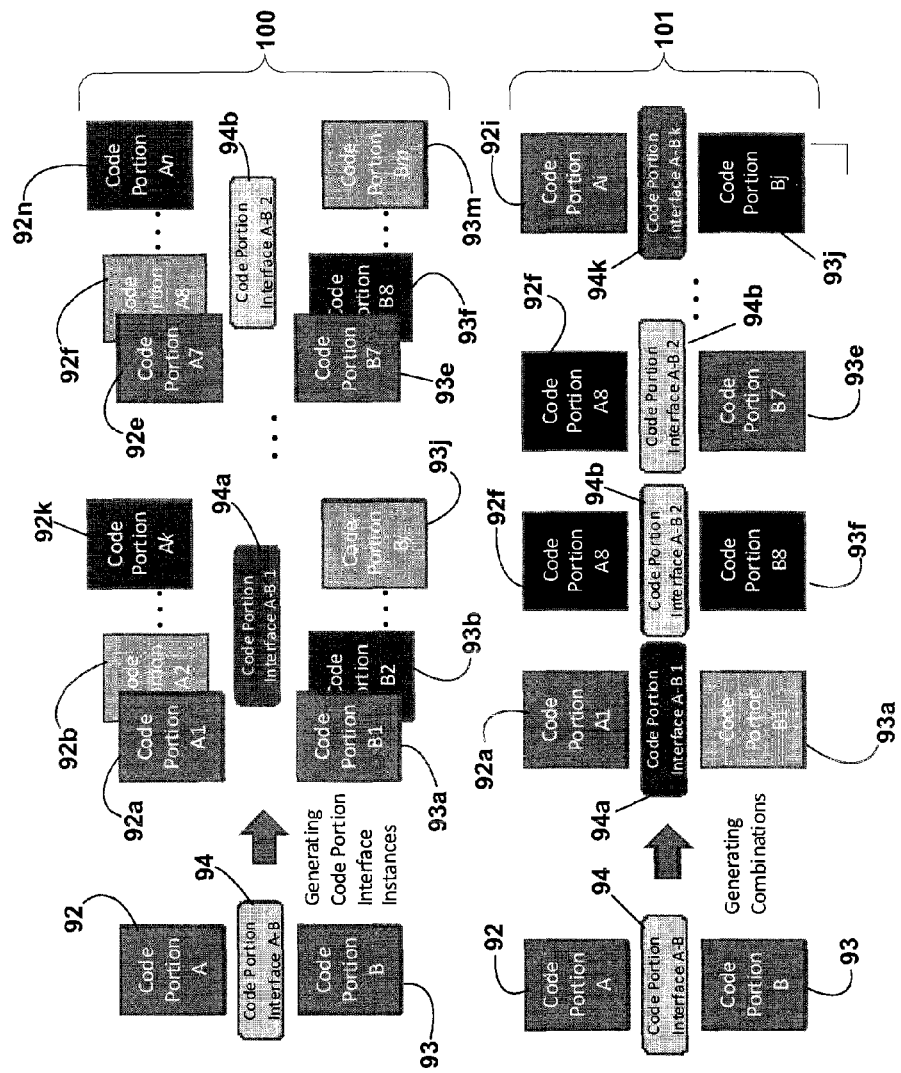
FIG. 10 illustrates one exemplary method for generating diverse code portion interfaces together with diverse code portions in accordance with the present invention.

As an alternative to the method shown and described with regard to FIG. 9, the code portion interfaces may also be varied, rather than fixed, thereby creating diverse interfaces, as well as, diverse code portions. This effort increases the number of full instances that may be created and is shown in regard to FIG. 10. FIG. 10 illustrates one exemplary method for generating diverse code portion interfaces together with diverse code portions in accordance with the present invention.

With further regard to FIG. 10, there are again shown two sub-procedures 100, 101 which, respectively, illustrate both the generation of the code portion variations and code portion interface instances and the generation of the related combinations of these code portion variations and interface instances. Code portions 92 and 93 and interface 94 are shown in a similar as in FIG. 9, however the variations and combinations differ slightly as described further herein below.

As can be seen in sub-procedure 100, code portions 92 and 93 shown as code portion A and code portion B, respectively, may be written multiple times as a first set of code portions A1, A2, . . . Ak and B1, B2, . . . Bj where k and j are integers representative of the possible first set of variations for portions A and B, 92, 93. Further, code portions 92 and 93 are also written multiple times as a second set of code portions A7, A8, . . . An and B7, B8, . . . Bm where n and m are integers representative of the possible second set of variations for portions A and B, 92, 93. The first set of these multiple code portions 92a, 92b, . . . 92k and 93a, 93b, . . . 93i and the second set of these multiple code portions 92a, 92b, . . . 92n and 93a, 93b, . . . 93m each include a respective variation of code portion interface A-B. As shown, the first set includes a code portion interface A-B 1 (94a) only usable in first set combinations and the second set includes a code portion interface A-B 2 (94b) only usable in second set combinations. As in FIG. 9, it should be understood that the variations embodied in code portions shown in FIG. 10 may be generated once and stored, for example, in a library for later use in sub-procedure 101.

In sub-procedure 100, combinations are generated using the previously generated first set of code portion instances 92a, 92b, . . . 92k and 93a, 93b, . . . 93i and second set of code portion instances 92a, 92b, . . . 92n and 93a, 93b, . . . 93m. Here, code portion/interface combinations shown include code portion/interface instance combination A1/B1 (92a, 93a) with code portion interface A-B 1 (94a), code portion instance combination A8/B8 (92f, 93f) with code portion interface A-B 2 (94b), and code portion instance combination A8/B7 (92f, 93e) with code portion interface A-B 2 (94b). The total combinations may be made up to combination Ai/Bj (92i, 93j) with code portion interface A-B k (94k) where i and j represents the number of combinational variations for a particular total set of code portions and k represents the number of combinational variations for the code portion interfaces.

It should be readily apparent that the different types of code portions in FIG. 10 have different diversification properties at the interfaces. However, the internals of a particular code portion may be diversified using a great number of methods including those described in U.S. Pat. Nos. 6,594,761, 6,779,114, or 6,842,862 each issued to Chow et al. and incorporated herein by reference in their entireties. and combinations thereof. For example, considering the control-flow of a particular code portion, when combined with control-flow flattening techniques (such as described in U.S. Pat. No. 6,779,114 issued to Chow et al.) the following items may be varied: block layout, block order, constant selection, families of block selection functions, dummy blocks, or control function calculations. As another example, considering the data-flow transformation techniques (such as in U.S. Pat. Nos. 6,594,761 and 6,842,862 each issued to Chow et al.) of a particular code portion, the following may be varied: families of transformation functions, constant selection, or entities to which transformations are applied.

Figure 11:
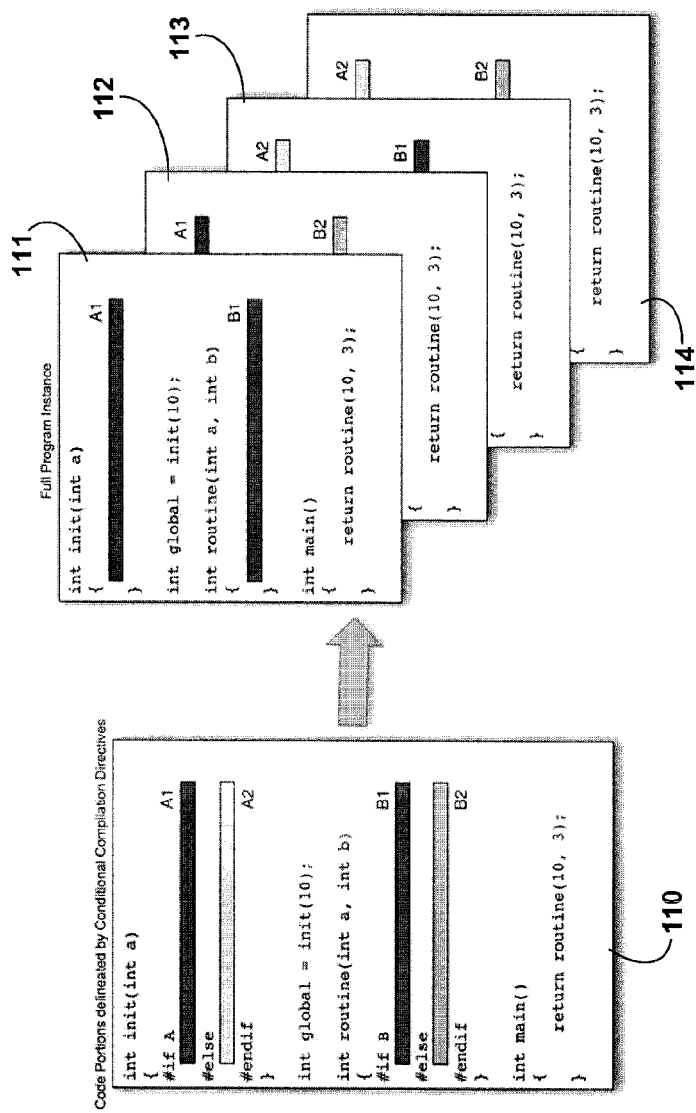
FIG. 11 illustrates delineation of code portion instances through conditional compilation directives in accordance with the present invention.

Once diversity for the code portions and the interfaces has been accomplished (i.e., step 33 illustrated in FIG. 3), aggregation of code portion instances into full program instances (i.e., step 34 in FIG. 3) can then be accomplished as further shown and described with regard to FIG. 11. Full program instances are created by aggregating code portion instances and code portion interfaces together. The number and variety of full program instances is highly dependent on the previous step (i.e., step 33 illustrated in FIG. 3) of generating code portion instances described above in detail with regard to FIGS. 9 and 10. The aggregation process can be a time-consuming task, especially for some types of partitioning such as data-flow and program-flow partitioning. This is because compiler analysis phases are required.

Therefore, the approach embodied in the present invention is to provide the generation of many diverse code portion instances at once, such that the process of aggregation is a simple post-process. The present invention uses an approach having the following steps to arrive at the final program instances.

Step 1) Select the types of partitioning to be used on an input program.

Step 2) Analyze the program for the purposes of step 3.

Step 3) Select the code portions and interfaces for the program.

Step 4) Create diverse instances of the code portions and interfaces.

Step 5) Aggregate the appropriate code portions into full program instances.

It should be understood that given steps 1 through 5 above, that step 2 may be performed once for a particular program instead of taking the approach whereby step 1 and 2 are repeated.

Additionally, the present invention propose an embodiment for step 5 where all the diverse code portion instances are collected in a very large mega-set, and delineated through conditional compilation directives. This allows aggregation of full program instances through a straight-forward approach of invoking the target compiler with a consistent set of defined macros. This is illustrated in FIG. 11, where two sets of independent code (A1, A2 and B1, B2 seen in block 110) are delineated by conditional compilation directives, allowing four full program instances (111, 112, 113, 114) to be created.

Figure 12:
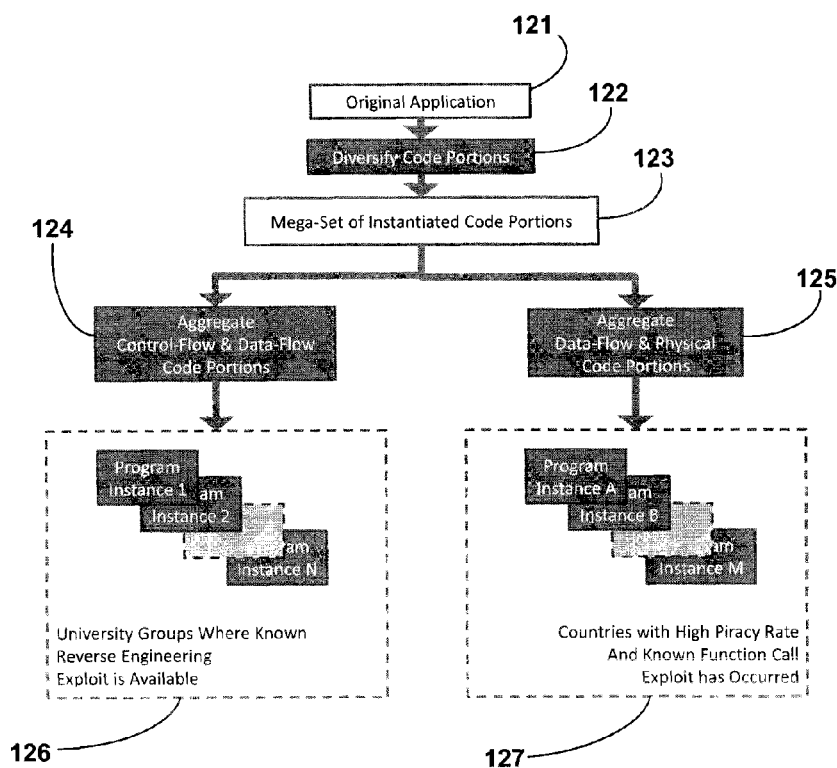
FIG. 12 illustrates aggregating program instances and deploying instantiated programs to target groups in accordance with the present invention.

Aggregation of program instances and deployment of such instantiated programs to target groups will now be described in regard to FIG. 12. The aggregation step is most effective when considering the attack landscape and security goal aimed, which is the resulting objective. For example, if there are high threats on the function boundaries of a system, then choosing code portion interfaces at the function interface is not preferable. It may be better to choose code portions physically at the compilation unit level or choose code portions at the data-flow level because diversification at this level resists comparisons at the function interface. As another example, if a particular application has been reverse-engineered by an attacker, then choosing code portions and aggregations based on program-flow may be a good choice because comparisons of control-flow are hindered by the diversification and control-flow information is a common first target needed by reverse-engineering.

Aggregation can also be set-up based on a combination of methods, to produce full program instances targeted for specific audiences. For example, if there is a threat of collusion among a specific or regional user-group of an application, the diversification efforts can target those groups to increase the level of resistance for particular threats. This is illustrated in the block diagram of FIG. 12, where two different sets 126, 127 of diversified program instances are targeted to two audiences where different threats are known to exist. Here, the original application 121 is processed into diversified code portions 122 to produce a mega-set 123 of instantiated code portions. Selectivity may then be provided among the aggregation methods previously described based upon factors such as, but not limited to, the attack landscape or the security goals. Here, control-flow and data-flow partitioning are used at 124 and data-flow and physical partitioning are used at 125 for the respective target audiences—e.g., university groups where known reverse engineering exploitation is available at 126 and countries with high-piracy rates and known function call exploitation has occurred at 127. Of course, it should be readily apparent that FIG. 12 is but one example and various combinations of the methods described herein may be used given differing application scenarios.

It should be understood that creation of many diverse program instances as described above is only useful if there is confidence that all of the instances have identical behavior. Therefore, testing such diverse instances (as seen and described earlier in regard to step 36 of FIG. 3) is an important requirement. However, exhaustive testing of every diverse instance quickly becomes too burdensome to be practical. What is needed, and provided by the present invention, is a comparatively small set of program instances that are representative of the full set of diverse instances created. In particular, the present invention ensures that every code portion instance is tested at least once, and moreover, that combinations of code portion instances are tested, as problems may occur at the code portion interfaces.

As the code portions are constructed, the input/output characteristics are formed such that it is possible to create at least j full program instances, where j is a bounded number, much less than the maximum number of code portion combinations. The number of program instances, j, may be arrived at by using a covering array of code portion combinations. Covering arrays are known combinatorial designs useful in pair-wise or "t-wise" testing of systems and are not further detailed herein. Due to the reality that exhaustive testing is too expensive and random testing fails to guarantee coverage, a covering array provides balanced tradeoffs. More specifically, use of a covering array will detect errors coming from all pair-wise or "t-wise" interactions of parameter values, while minimizing the number of tests.

As an example, consider a program divided into five code portions (A, B, C, D and E), with two diverse instances (1 and 2) for each portion. The total number of code portion combinations is $2^5$, or thirty-two combinations. Table 1 below shows how all pair-wise combinations of code portion instances can be tested with just eight full program instances.

TABLE 1

| Test 1 | A1 | B1 | C1 | D1 | E1 |
| Test 2 | A2 | B1 | C1 | D2 | E2 |
| Test 3 | A1 | B2 | C1 | D2 | E1 |
| Test 4 | A1 | B1 | C2 | D1 | E2 |
| Test 5 | A2 | B2 | C1 | D1 | E2 |
| Test 6 | A2 | B1 | C2 | D2 | E1 |
| Test 7 | A1 | B2 | C2 | D2 | E2 |
| Test 8 | A2 | B2 | C2 | D1 | E1 |

Furthermore, as the construction of code portions is characterized by their input/output characteristics, this gives further opportunity for testing. Automatically generated test vectors, which exercise both regular and boundary conditions, may be established for the code portions in isolation. This is a further benefit of the present invention, and presents a new opportunity for effective instance testing.

The method steps of the invention may be embodied in sets of executable machine code stored in a variety of formats such as object code or source code. Such code has been described generically herein as algorithms, alternative algorithms, programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

It would also be clear to one skilled in the art that this invention need not be limited to the existing scope of computers and computer systems. Credit, debit, bank, and smart cards could be encoded to apply the invention to their respective applications. An electronic commerce system in a manner of the invention could for example, be applied to parking meters, vending machines, pay telephones, inventory control or rental cars and using magnetic strips or electronic circuits to store the software and passwords. Again, such implementations would be clear to one skilled in the art, and do not take away from the invention. The above-described embodiments of the present invention are intended to be examples only. It should be equally apparent that many different types of software, or pieces of software, may benefit from strengthened security by way of the present invention. Moreover, alterations, modifications, and variations may be effected to the particular embodiments by those of skill in the art without departing from the scope of the invention, which is defined solely by the claims appended hereto.

The invention claimed is:

1. A method executed by one or more computing devices for providing build-time diversity in computer software source code, said method comprising:
    partitioning, by at least one of the one or more computing devices, the code into code portions;
    identifying, by at least one of the one or more computing devices, code portion interfaces of the code portions based at least in part on external dependencies of one or more of the code portions, wherein code portion interfaces comprise inter-dependencies of a code portion which allow the code portion to be compatible with one or more other code portions;
    generating, by at least one of the one or more computing devices, diverse code portion instances from the code portions;
    generating, by at least one of the one or more computing devices, interface instances from the code portion interfaces, wherein the interface instances comprise one or more of duplicate code portion interfaces and diverse instances of code portion interfaces;
    creating, by at least one of the one or more computing devices, test instances from the diverse code portion instances and the interface instances, wherein the test instances are created using a covering array which covers all possible instance groupings of a predetermined size in the diverse code portion instances and the interface instances; and
    generating, by at least one of the one or more computing devices, deployment instances using varied combinations of the diverse code portion instances and the interface instances, wherein the number of deployment instances is greater than the number of test instances and wherein operability of all the deployment instances is assured by confirming operability of the test instances.

2. The method as claimed in claim 1, wherein partitioning comprises physically partitioning the code.

3. The method as claimed in claim 2, wherein the physical partitioning is based upon compilation units and the code portion interfaces include all global data and function dependencies outside of the compilation units.

4. The method as claimed in claim 2, wherein the physical partitioning is based upon function definitions and the code portion interfaces include a function signature related to a corresponding one of the function definitions, all global variables, and all sub-functions on which the corresponding one of the function definitions depends.

5. The method as claimed in claim 1, wherein partitioning comprises program flow partitioning the code.

6. The method as claimed in claim 5, wherein the program flow partitioning is based upon function call sub-graphs wherein each one of the sub-graphs forms an instance of the code portions.

7. The method as claimed in claim 5, wherein the program flow partitioning is based upon basic blocks of the code.

8. The method as claimed in claim 1, wherein partitioning comprises data flow partitioning the code.

9. The method as claimed in claim 8, wherein the data flow partitioning is based upon data encodings of the code.

10. The method as claimed in claim 1, wherein generating diverse code portion instances further comprises aggregating a plurality of diverse code portion instances into a mega-set of instantiated code portions.

11. The method as claimed in claim 10, wherein generating diverse code portion instances further comprises selecting the diverse code portions instances from said the mega-set of instantiated code portions based upon user criteria.

12. The method of claim 1, wherein the predetermined size is two and wherein the covering array covers all possible pairs of the diverse code portion instances and the interface instances.

13. An apparatus for providing build-time diversity in computer software source code, the apparatus comprising:
one or more processors; and
one or more memories operatively coupled to at least one of the one or more processors and having instructions stored thereon that, when executed by at least one of the one or more processors, cause at least one of the one or more processors to:
partition the code into code portions;
identify code portion interfaces of the code portions based at least in part on external dependencies of one or more of the code portions, wherein code portion interfaces comprise inter-dependencies of a code portion which allow the code portion to be compatible with one or more other code portions;
generate diverse code portion instances from the code portions;
generate interface instances from the code portion interfaces, wherein the interface instances comprise one or more of duplicate code portion interfaces and diverse instances of code portion interfaces;
create test instances from the diverse code portion instances and the interface instances, wherein the test instances are created using a covering array which covers all possible instance groupings of a predetermined size in the diverse code portion instances and the interface instances; and
generate deployment instances using varied combinations of the diverse code portion instances and the interface instances, wherein the number of deployment instances is greater than the number of test instances and wherein operability of all the deployment instances is assured by confirming operability of the test instances.

14. The apparatus of claim 13, wherein the instructions that, when executed by at least one of the one or more processors, cause at least one of the one or more processors to partition the code further cause at least one of the one or more processors to:
physically partition the code.

15. The apparatus of claim 14, wherein the physical partitioning is based upon compilation units and the code portion interfaces include all global data and function dependencies outside of the compilation units.

16. The apparatus of claim 14, wherein the physical partitioning is based upon function definitions and the code portion interfaces include a function signature related to a corresponding one of the function definitions, all global variables, and all sub-functions on which the corresponding one of the function definitions depends.

17. The apparatus of claim 13, wherein the instructions that, when executed by at least one of the one or more processors, cause at least one of the one or more processors to partition the code further cause at least one of the one or more processors to:
program flow partition the code.

18. The apparatus of claim 17, wherein the program flow partitioning is based upon function call sub-graphs wherein each one of the sub-graphs forms an instance of the code portions.

19. The apparatus of claim 17, wherein the program flow partitioning is based upon basic blocks of the code.

20. The apparatus of claim 13, wherein the instructions that, when executed by at least one of the one or more processors, cause at least one of the one or more processors to partition the code further cause at least one of the one or more processors to:
data flow partition the code.

21. The apparatus of claim 20, wherein the data flow partitioning is based upon data encodings of the code.

22. The apparatus of claim 13, wherein the instructions that, when executed by at least one of the one or more processors, cause at least one of the one or more processors to generate diverse code portion instances further cause at least one of the one or more processors to:
aggregate a plurality of diverse code portion instances into a mega-set of instantiated code portions.

23. The apparatus of claim 22, wherein the instructions that, when executed by at least one of the one or more processors, cause at least one of the one or more processors to generate diverse code portion instances further cause at least one of the one or more processors to
select the diverse code portions instances from the mega-set of instantiated code based upon user criteria.

24. The apparatus of claim 13, wherein the predetermined size is two and wherein the covering array covers all possible pairs of the diverse code portion instances and the interface instances.

25. At least one non-transitory computer-readable medium storing computer-readable instructions that, when executed by one or more computing devices, cause at least one of the one or more computing devices to:
partition the code into code portions;

identify code portion interfaces of the code portions based at least in part on external dependencies of one or more of the code portions, wherein code portion interfaces comprise inter-dependencies of a code portion which allow the code portion to be compatible with one or more other code portions;

generate diverse code portion instances from the code portions;

generate interface instances from the code portion interfaces, wherein the interface instances comprise one or more of duplicate code portion interfaces and diverse instances of code portion interfaces;

create test instances from the diverse code portion instances and the interface instances, wherein the test instances are created using a covering array which covers all possible instance groupings of a predetermined size in the diverse code portion instances and the interface instances; and generate deployment instances using varied combinations of the diverse code portion instances and the interface instances, wherein the number of deployment instances is greater than the number of test instances and wherein operability of all the deployment instances is assured by confirming operability of the test instances.

26. The at least one non-transitory computer-readable medium of claim 25, wherein the instructions that, when executed by at least one of the one or more computing devices, cause at least one of the one or more computing devices to partition the code further cause at least one of the one or more computing devices to:
physically partition the code.

27. The at least one non-transitory computer-readable medium of claim 26 wherein the physical partitioning is based upon compilation units and the code portion interfaces include all global data and function dependencies outside of the compilation units.

28. The at least one non-transitory computer-readable medium of claim 26 wherein the physical partitioning is based upon function definitions and the code portion interfaces include a function signature related to a corresponding one of the function definitions, all global variables, and all sub-functions on which the corresponding one of the function definitions depends.

29. The at least one non-transitory computer-readable medium of claim 25, wherein the instructions that, when executed by at least one of the one or more computing devices, cause at least one of the one or more computing devices to partition the code further cause at least one of the one or more computing devices to:
program flow partition the code.

30. The at least one non-transitory computer-readable medium of claim 29 wherein the program flow partitioning is based upon function call sub-graphs wherein each one of the sub-graphs forms an instance of the code portions.

31. The at least one non-transitory computer-readable medium of claim 29, wherein the program flow partitioning is based upon basic blocks of the code.

32. The at least one non-transitory computer-readable medium of claim 25 wherein the instructions that, when executed by at least one of the one or more computing devices, cause at least one of the one or more computing devices to partition the code further cause at least one of the one or more computing devices to:
data flow partition the code.

33. The at least one non-transitory computer-readable medium of claim 32 wherein the data flow partitioning is based upon data encoding of the code.

34. The at least one non-transitory computer-readable medium of claim 25 wherein the instructions that, when executed by at least one of the one or more computing devices, cause at least one of the one or more computing devices to generate diverse code portion instances further cause at least one of the one or more computing devices to:
aggregate a plurality of diverse code portion instances into a mega-set of instantiated code portions.

35. The at least one non-transitory computer-readable medium of claim 34, wherein the instructions that, when executed by at least one of the one or more computing devices, cause at least one of the one or more computing devices to generate diverse code portion instances further cause at least one of the one or more computing devices to:
select the diverse code portions instances from the mega-set of instantiated code portions based upon user criteria.

36. The at least one non-transitory computer-readable medium of claim 25, wherein the predetermined size is two and wherein the covering array covers all possible pairs of the diverse code portion instances and the interface instances.

* * * * *

UNITED STATES PATENT AND TRADEMARK OFFICE
CERTIFICATE OF CORRECTION

| | | |
|---|---|---|
| PATENT NO. | : 8,990,785 B2 | Page 1 of 1 |
| APPLICATION NO. | : 13/812404 | |
| DATED | : March 24, 2015 | |
| INVENTOR(S) | : Robert Durand et al. | |

It is certified that error appears in the above-identified patent and that said Letters Patent is hereby corrected as shown below:

On the Title Page, item (73) the "Assignee" section should read as follows:

-- Irdeto Canada Corporation, Ottawa, CA --

Signed and Sealed this
Twenty-seventh Day of October, 2015

Michelle K. Lee
*Director of the United States Patent and Trademark Office*